(12) United States Patent
Taylor

(10) Patent No.: US 7,280,355 B2
(45) Date of Patent: Oct. 9, 2007

(54) APPARATUS FOR USE WITH LAPTOP COMPUTER

(76) Inventor: Paul G. Taylor, 114 Surfside La., Mooresville, NC (US) 28117-7464

(*) Notice: Subject to any disclaimer, the term of this patent is extended or adjusted under 35 U.S.C. 154(b) by 0 days.

(21) Appl. No.: 11/126,874

(22) Filed: May 11, 2005

(65) Prior Publication Data

US 2006/0256517 A1    Nov. 16, 2006

(51) Int. Cl.
*G06F 1/20* (2006.01)
(52) U.S. Cl. .................. 361/687; 206/320; 224/578
(58) Field of Classification Search ........ 361/679–687, 361/724–727; 206/760, 45.25, 320; 224/584, 224/578
See application file for complete search history.

(56) References Cited

U.S. PATENT DOCUMENTS

| 5,887,723 A | * | 3/1999 | Myles et al. ................ 206/760 |
| 5,887,777 A | * | 3/1999 | Myles et al. ................ 224/578 |
| 2005/0276006 A1 | * | 12/2005 | Lim et al. .................. 361/683 |

* cited by examiner

*Primary Examiner*—Hung Van Duong
(74) *Attorney, Agent, or Firm*—Moore & Van Allen PLLC

(57) ABSTRACT

An apparatus for reducing the amount of heat transferred to a user by a laptop computer is provided. The apparatus includes at least one support member, at least one thermal member, and a jacket for at least partially enclosing the support member and the thermal member. The thermal member is structured to absorb heat transferred from the laptop computer.

21 Claims, 6 Drawing Sheets

APPARATUS FOR USE WITH LAPTOP COMPUTER

FIELD OF THE INVENTION

The present invention is related to laptop computers and, more particularly, to an apparatus for absorbing heat transferred from the laptop computer.

BACKGROUND OF THE INVENTION

Laptop computers generate significant heat when in use. Often times, a user will position the laptop computer on their legs when no table or other work surface is available. In such case, at least some of the heat generated by the computer is transferred to the user's lap. This heat can be nuisance to the user. For men, repetitive and prolonged exposure to the heat generated by a laptop computer can have adverse medical effects, including lowering sperm count and increasing the risk of infertility. Thus, there is a need for an apparatus for reducing the amount of heat transferred to a user by a laptop computer. Given the portability of laptop computers, the apparatus should not be bulky or require an external power source to operate.

BRIEF SUMMARY OF THE INVENTION

The present invention provides an apparatus for reducing the amount of heat transferred to a user by a laptop computer. According to one embodiment, the apparatus includes at least one support member, at least one thermal member, and a jacket for at least partially enclosing the support member and the thermal member, wherein the thermal member is structured to absorb heat transferred from the laptop computer thereby reducing the amount of heat that is transferred to the user. In addition, the absorption of heat by the thermal member also acts to transfer heat away from the laptop computer and, specifically, the central processing unit ("CPU") of the laptop computer. Thus, the at least one thermal member assists the passive and/or active heat sinks (such as a fan) contained within the laptop computer to maintain the temperature of the CPU so that the CPU operates reliably. In one embodiment, the jacket is formed from fabric, leather, or vinyl. In another embodiment, one side of the jacket comprises a fastener. In one embodiment, the fastener includes a zipper, a hook and loop fastener, or buttons. In another embodiment, the jacket is sealed. In another embodiment, the jacket comprises an affinity motif. In another embodiment, the support member is formed from cardboard, plastic, or metal. In another embodiment, the thermal member comprises gel enclosed within a cover. In yet another embodiment, the apparatus includes at least one insulating member. In one embodiment, the insulating member comprises at least one of polyurethane foam or polyethylene foam. In still another embodiment, the insulating member is positioned between the support member and the thermal member.

According to another embodiment of the present invention, the apparatus includes at least one support member, at least one insulating member, at least one thermal member comprising gel enclosed within a cover, and a jacket for at least partially enclosing the support member, the insulating member and the thermal member, wherein the thermal member is structured to absorb heat transferred from the laptop computer.

Thus, there is provided an apparatus for reducing the amount of heat transferred to a user by a laptop computer. Advantageously, the apparatus is not bulky and does not require an external power source to operate.

BRIEF DESCRIPTION OF THE DRAWINGS

Figure 1:
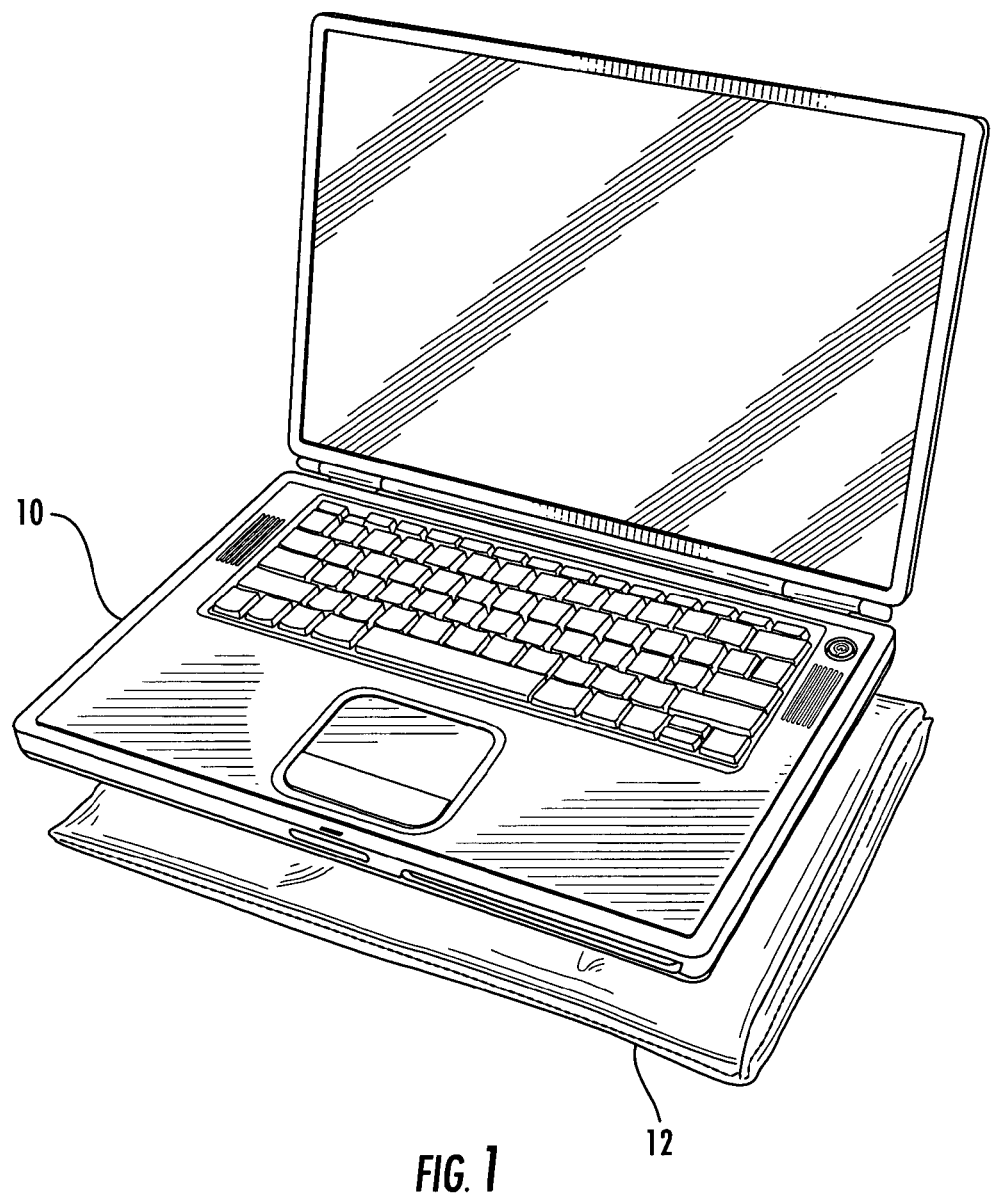
Figure 2:
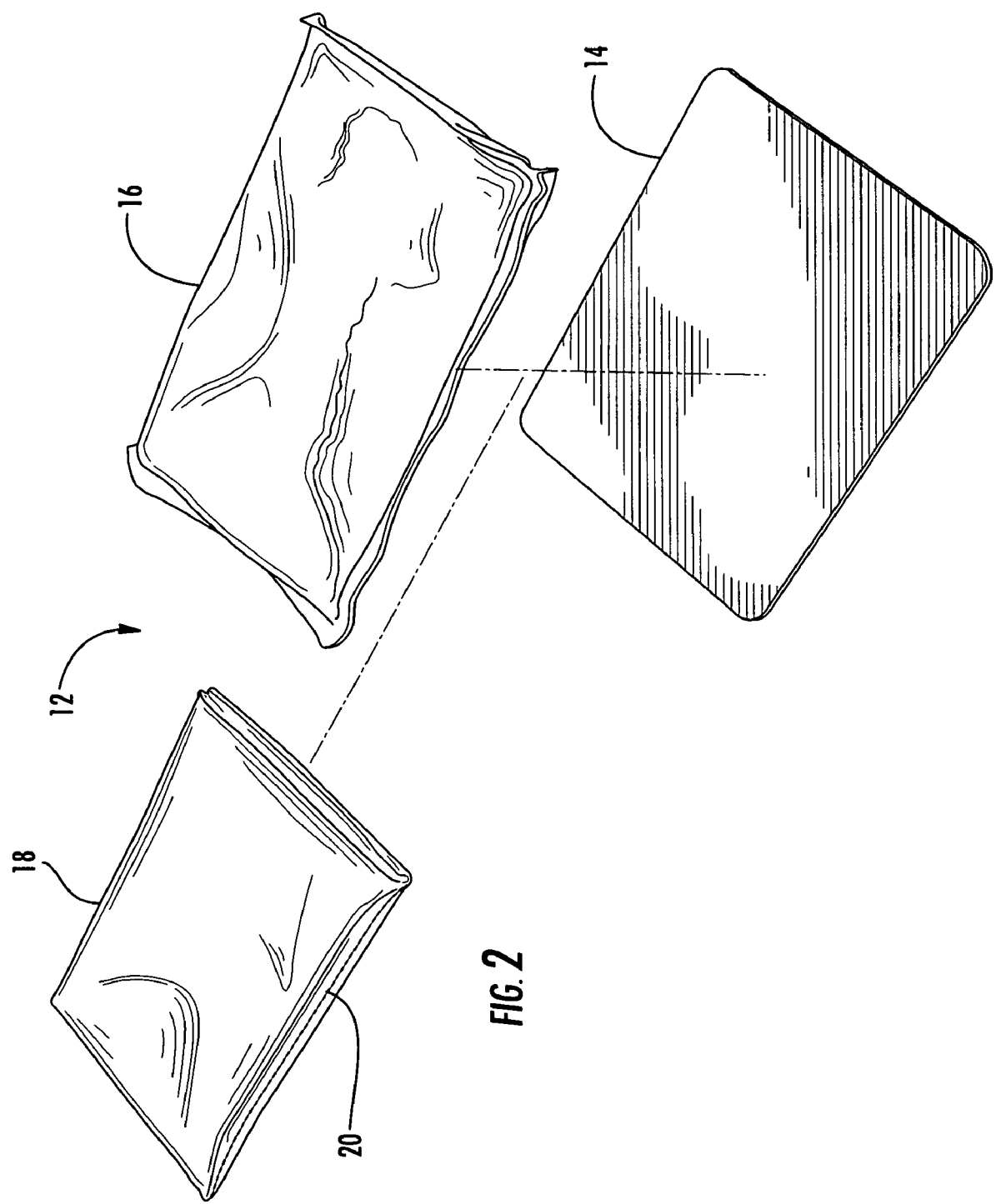
Figure 3:
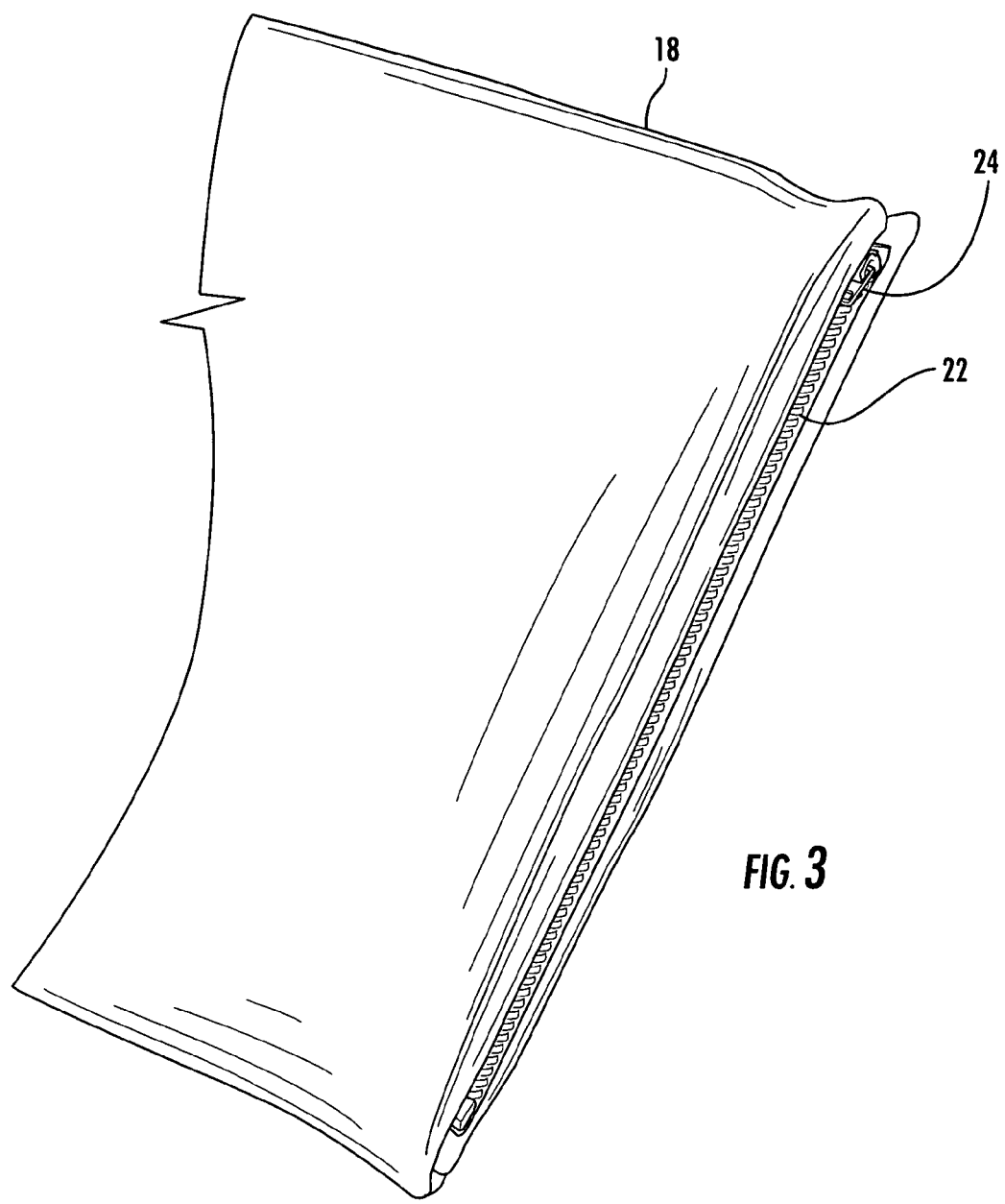
Figure 4:
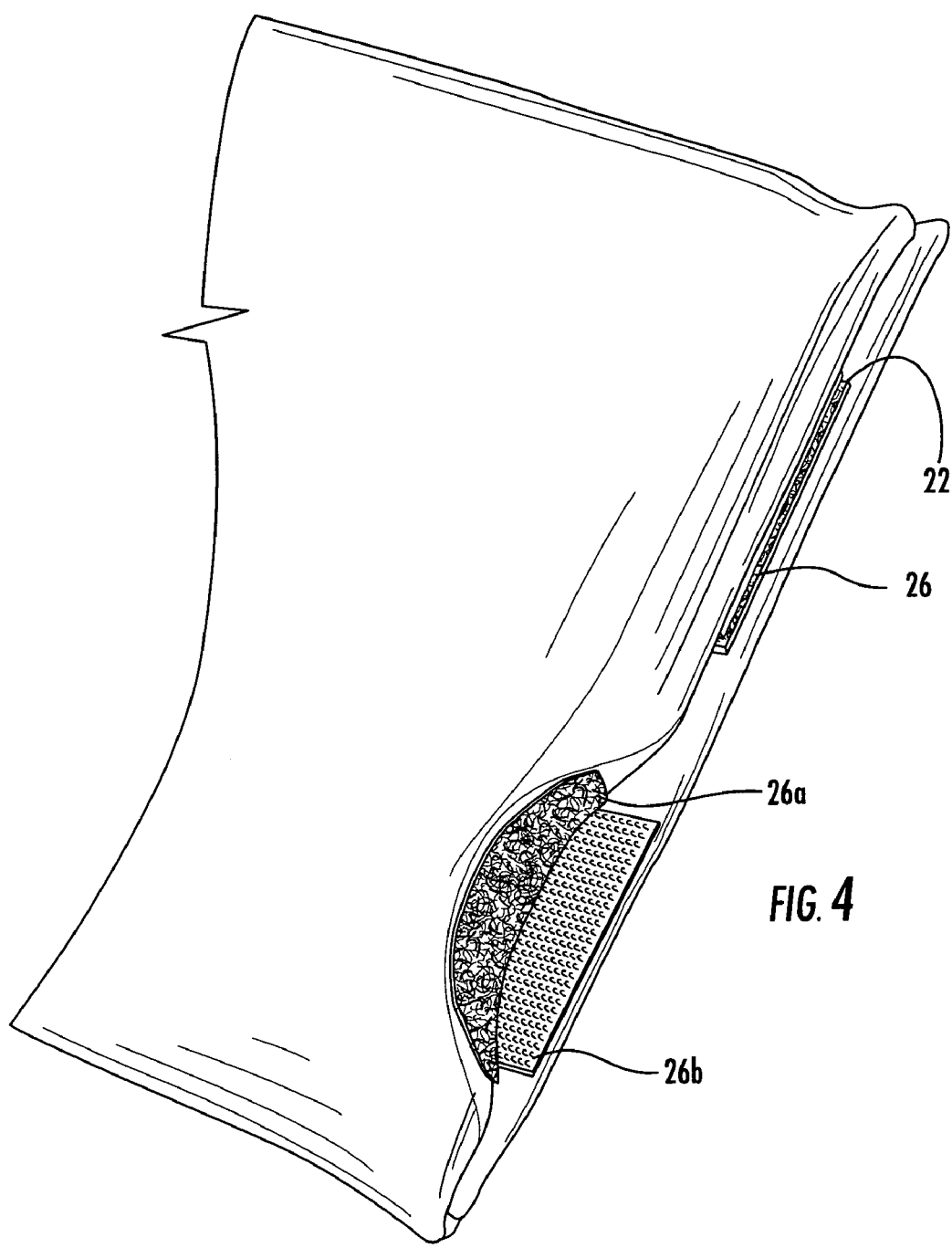
Figure 5:
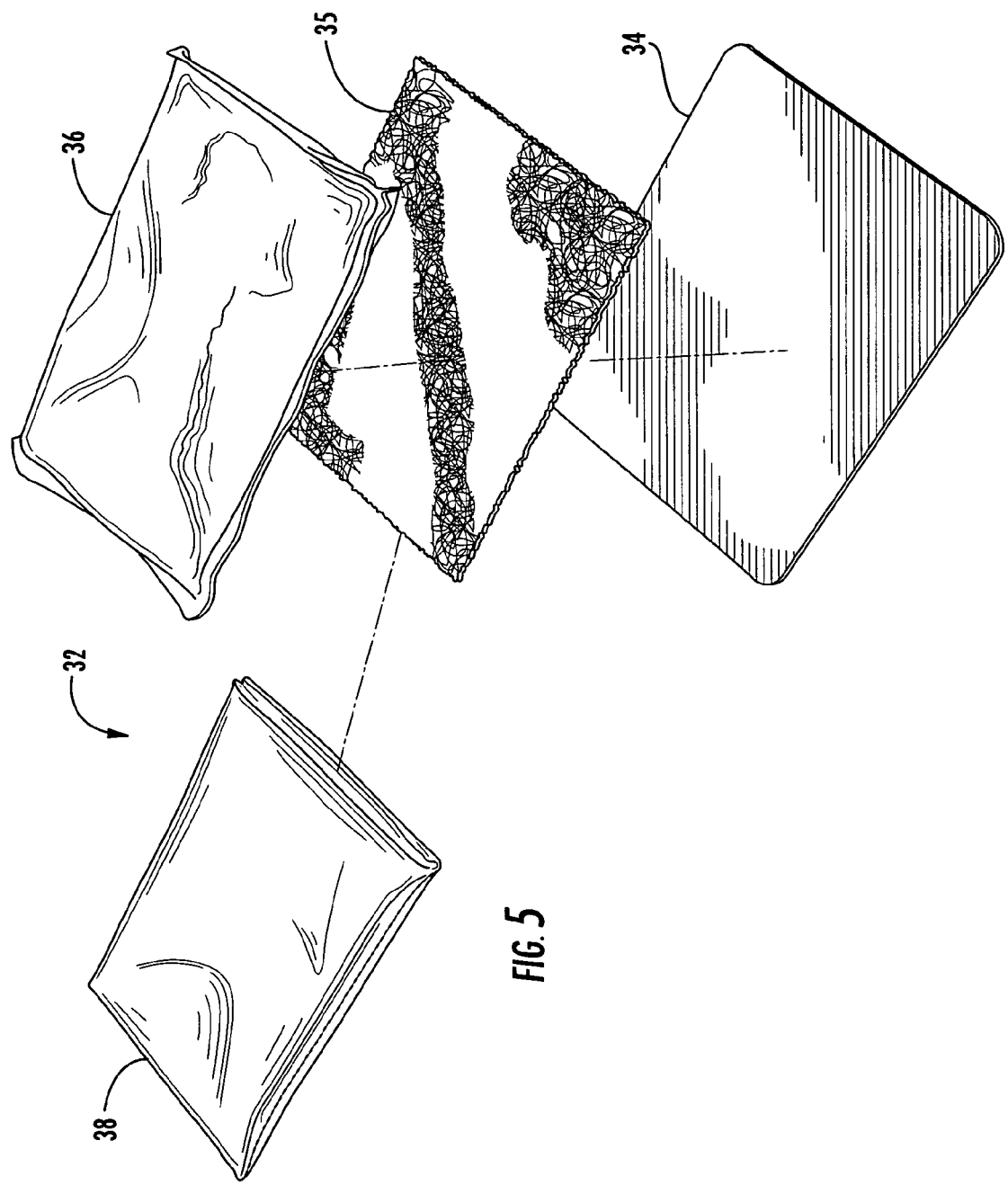
Figure 6:
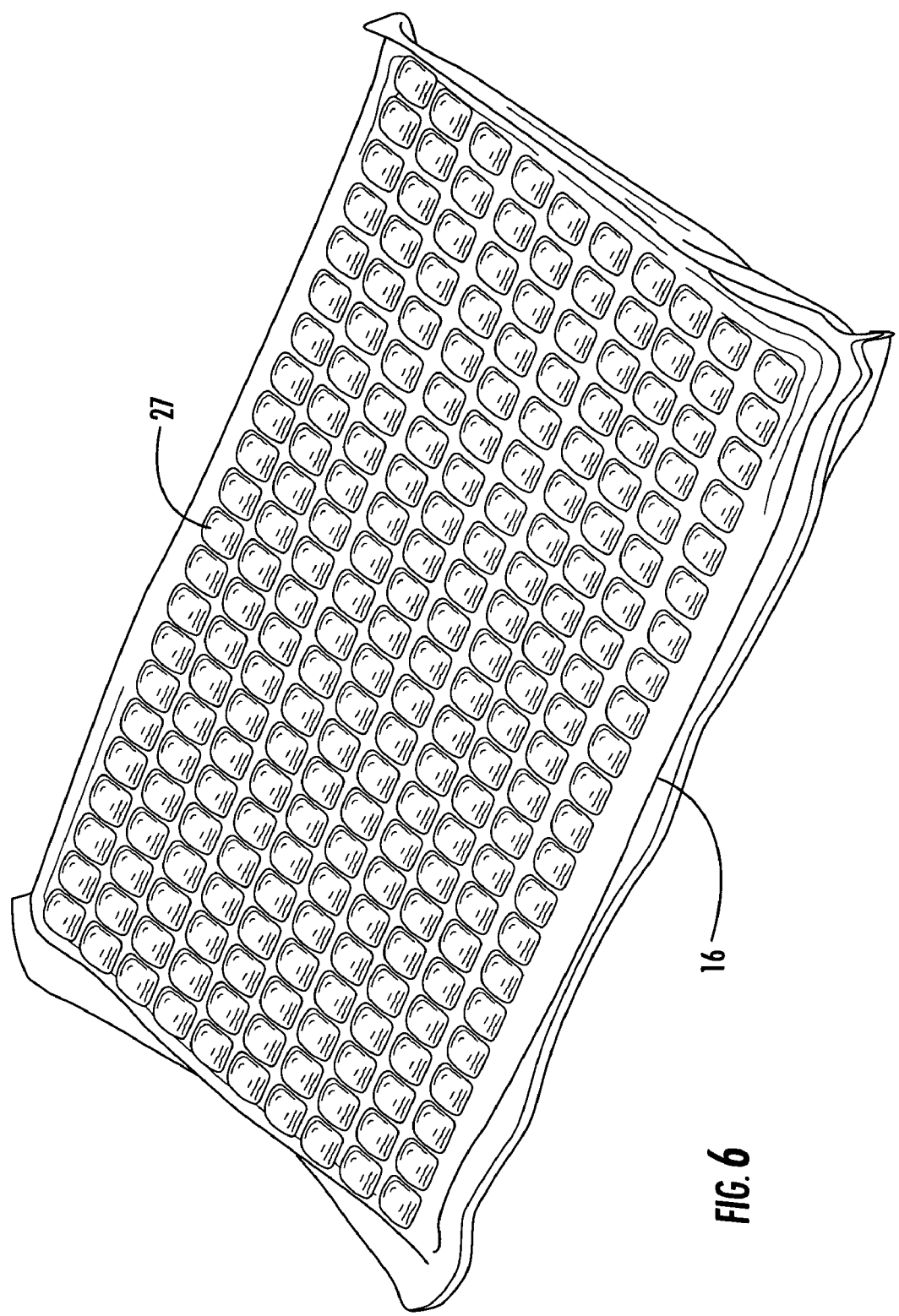

Having thus described the invention in general terms, reference will now be made to the accompanying drawings, which are not necessarily drawn to scale, and wherein:

FIG. 1 is a perspective view illustrating a laptop computer positioned on an apparatus for reducing the amount of heat transferred to a user by the laptop computer, according to one embodiment of the present invention;

FIG. 2 is an exploded perspective view illustrating the components of the apparatus of FIG. 1, according to one embodiment of the present invention;

FIG. 3 is a partial perspective view illustrating the jacket of the apparatus of FIG. 1 with a fastener comprising a zipper, according to one embodiment of the present invention;

FIG. 4 is a partial perspective view illustrating the jacket of the apparatus of FIG. 1 with a fastener comprising hook and loop fasteners, according to one embodiment of the present invention;

FIG. 5 is an exploded perspective view illustrating the components of the apparatus of FIG. 1, according to another embodiment of the present invention; and FIG. 6 is a partial perspective view of a thermal member, according to another embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring to FIG. 1, there is illustrated a laptop computer 10 and an apparatus 12 for reducing the amount of heat transferred to a user by the laptop computer. The dimensions of the apparatus 12 can vary, but the apparatus preferably is sized approximate to the dimensions (i.e., length and width) of the laptop computer 10. Since laptop computers 10 come in different dimensions, apparatuses 12 having different corresponding dimensions can be provided. The thickness of the apparatus 12 can vary from approximately ½ inch to 1-1;2 inches, but will vary depending on the construction of the apparatus, as discussed more fully below. In any event, the dimensions of the apparatus should be such that the apparatus 12 can fit into common travel bags (e.g., a purse, brief case, suitcase, laptop computer case, etc.).

Referring to FIG. 1, the apparatus 12 includes at least one support member 14, at least one thermal member 16 and a jacket 18 for at least partially enclosing the support member and the thermal member. The support member 14 can comprise a semi-rigid member having sufficient stiffness to form a relatively flat service for the laptop computer. The support member 14 should have some flexibility so that the apparatus 12 will at least partially conform to the support surface under the apparatus (e.g., the user's lap) and can bent as necessary to store the apparatus. The support member 14 should be relatively thin in order to minimize the thickness of the apparatus 12 so that the apparatus is not bulky, but is instead easily portable in a common travel bag (e.g., a purse, brief case, suitcase, laptop computer case, etc.). In one embodiment, the support member 14 can be formed from a relatively thin sheet of cardboard, plastic (e.g., polypropylene polymer plastic), or metal having a length and width slightly less than the dimensions of the jacket 18 of the apparatus 12. For additional stiffness, two or more of the support members 14 can be provided or, alternatively, the thickness of the support member 14 can be increased.

The thermal member 16 is structured to absorb heat transferred from the bottom of the laptop computer 10 so that the heat is not transferred to the user's lap. In one embodiment, the thermal member 16 comprises a gel pack, such as a commercially available hot/cold gel pack. The exact composition of these gel packs varies, but typically includes a composition made from selective salts of processed acrylic resins and/or other copolymers. In one embodiment, the gel preferably is non-toxic, non-volatile and biodegradable. Although not required, the gel should retain some flexibility even when frozen in order to maintain the flexibility of the apparatus 12. The gel pack preferably includes a sealed cover made of a durable plastic, fabric or other suitable material capable of enclosing and containing the gel inside. In other embodiments (not shown), the thermal member 16 can include other heat absorption material, provided such material provides sufficient heat absorption so that heat transferred from the bottom of the laptop computer 10 is substantially absorbed by the apparatus 12.

Advantageously, the gel of the thermal member 16 absorbs heat transferred from the laptop computer 10 thereby reducing the amount of heat that is transferred to the user. The heat absorption by the thermal member 16 also acts to transfer heat away from the laptop computer 10 and, specifically, the CPU of the laptop computer, which assists the passive and/or active heat sinks (such as a fan) contained within the laptop computer to maintain the temperature of the CPU so that the CPU operates reliably. In addition, although the thermal member 16 can be cooled by placing the thermal member in a refrigerator or freezer, it has been found that the thermal member 16 will absorb the heat transferred from the laptop computer 10 regardless of whether the thermal member has been cooled in a refrigerator or freeze. Thus, the apparatus 12 can operate without external power, which further facilitates the portability of the apparatus.

In one embodiment, as illustrated in FIG. 6, the thermal member 16 comprises a plurality of cells or raised portions 27, each of which comprises gel or another heat absorption material. The cells 27 can be on one or both sides of the thermal member 16. The cells 27 can be individually sealed so that the heat absorption material does not flow or move between adjacent cells or can be unsealed so that the heat absorption material is unrestricted and can flow or move between adjacent cells. This embodiment of the thermal member 16 is advantageous since the cells of 27 of the thermal member increase the cushioning provided by the apparatus 12. In addition, since the cells 27 increase the surface area of the thermal member 16, the cells also increase the heat absorption provided by the apparatus 12.

The jacket 18 can be formed from a variety of natural and synthetic materials, including, for purposes of example only and not limitation, fabric, leather, vinyl, fur etc. In one embodiment, the jacket 18 is sealed. For example, the jacket 18 can be sealed using stitching (such as thread or wire) or using a suitable adhesive. In another embodiment, as illustrated in FIGS. 3 and 4, three sides of the jacket 18 are sealed and one side of the jacket comprises a fastener 22 so that the thermal member 16 can be removed and cooled if desired or an additional support member 14, thermal member and/or insulating member 35 (as discussed below) can be inserted into the jacket. In one embodiment, as illustrated in FIG. 3, the fastener 22 includes a zipper 24. In another embodiment, as illustrated in FIG. 4, the fastener 22 includes one or more sets of hook (26b) and loop (26a) fasteners 26. In still another embodiment (not shown), the fastener 22 includes one or more buttons. To personalize the apparatus 12, the jacket 18 can include an affinity motif, such as a school logo, the name of a company, the user's name, etc.

According to another embodiment of the present invention, as illustrated in FIG. 5, the apparatus 32 includes at least one support member 34, at least one thermal member 36, and a jacket 38 for at least partially enclosing the support member and the thermal member. The support member 34, thermal member 36 and jacket 38 are constructed as discussed above. The apparatus 32 also includes at least one insulating member 35. In one embodiment, the insulating member 35 comprises a sheet of open cell polyurethane foam or low or high density polyethylene foam or a similar material with relatively high insulating properties. In another embodiment, the insulating member 35 can comprise two or more layers of polyurethane or polyethylene foam laminated together. In one embodiment, the insulating member 35 preferably is positioned between the support member 34 and the thermal member 36. According to this embodiment, the insulating member 35 can be laminated to the support member 34. In another embodiment (not shown), the thermal member 36 is positioned between the support member 34 and the insulating member 35.

Thus, there is provided an apparatus for reducing the amount of heat transferred to a user by a laptop computer. The heat absorption by the apparatus also acts to transfer heat away from the laptop computer and, specifically, the CPU of the laptop computer, which assists the passive and/or active heat sinks (such as a fan) contained within the laptop computer to maintain the temperature of the CPU so that the CPU operates reliably. Advantageously, the apparatus is not bulky, is portable and does not require an external power source to operate. In addition, the apparatus provides a support surface for the laptop computer on the user's lap. The apparatus may also be used to provide a protective support surface on a table or other work surface that the user does not want to scratch or overheat.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for reducing the amount of heat transferred to a user by a laptop computer, comprising:
   at least one support member;
   at least one thermal member, said at least one thermal member comprises a gel enclosed within a cover; and
   a flexible jacket for enclosing said at least one support member and said at least one thermal member, wherein said at least one thermal member is structured to absorb heat transferred from the laptop computer.

2. An apparatus as recited in claim 1 wherein said jacket is formed from a material selected from the group comprising fabric, leather, or vinyl.

3. An apparatus as recited in claim 1 wherein one side of said jacket comprises a fastener.

4. An apparatus as recited in claim 3 wherein said fastener is selected from the group consisting of a zipper, a hook and loop fastener, or buttons.

5. An apparatus as recited in claim 1 wherein said jacket is sealed.

6. An apparatus as recited in claim 1 wherein said jacket comprises an affinity motif.

7. An apparatus as recited in claim 1 wherein said at least one support member is formed from a material selected from the group consisting of cardboard, plastic, or metal.

8. An apparatus as recited in claim 1 wherein said at least one thermal member comprises a plurality of cells on at least one side of said at least one thermal member.

9. An apparatus as recited in claim 1 further comprising at least one insulating member.

10. An apparatus as recited in claim 9 wherein said at least one insulating member comprises at least one of polyurethane foam or polyethylene foam.

11. An apparatus as recited in claim 9 wherein said at least one insulating member is positioned between said at least one support member and said at least one thermal member.

12. An apparatus for reducing the amount of heat transferred to a user by a laptop computer, comprising:
   at least one support member;
   at least one insulating member;
   at least one thermal member comprising gel enclosed within a cover; and
   a jacket enclosing said at least one support member, said at least one insulating member and said at least one thermal member, wherein said at least one thermal member is structured to absorb heat transferred from the laptop computer.

13. An apparatus as recited in claim 12 wherein said jacket is formed from a material selected from the group comprising fabric, leather, or vinyl.

14. An apparatus as recited in claim 12 wherein one side of said jacket comprises a fastener.

15. An apparatus as recited in claim 14 wherein said fastener is selected from the group consisting of a zipper, a hook and loop fastener, or buttons.

16. An apparatus as recited in claim 12 wherein said jacket is sealed.

17. An apparatus as recited in claim 12 wherein said jacket comprises an affinity motif.

18. An apparatus as recited in claim 12 wherein said at least one support member is formed from a material selected from the group consisting of cardboard, plastic, or metal.

19. An apparatus as recited in claim 12 wherein said at least one insulating member comprises at least one of polyurethane foam or polyethylene foam.

20. An apparatus as recited in claim 12 wherein said at least one insulating member is positioned between said at least one support member and said at least one thermal member.

21. An apparatus as recited in claim 12 wherein said at least one thermal member comprises a plurality of cells on at least one side of said at least one thermal member.

* * * * *